(12) United States Patent
Dozen et al.

(10) Patent No.: US 11,500,594 B2
(45) Date of Patent: Nov. 15, 2022

(54) PRINT JOB TRANSMITTING DEVICE FOR TRANSMITTING A PRINT JOB AND NON-TRANSITORY COMPUTER-READABLE RECORDING MEDIUM STORING A PRINT JOB TRANSMITTING PROGRAM FOR THE SAME

(71) Applicant: KYOCERA Document Solutions Inc., Osaka (JP)

(72) Inventors: Kazuki Dozen, Osaka (JP); Takanori Miyamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/386,841

(22) Filed: Jul. 28, 2021

(65) Prior Publication Data
US 2022/0043611 A1 Feb. 10, 2022

(30) Foreign Application Priority Data

Aug. 4, 2020 (JP) .............................. JP2020-132471

(51) Int. Cl.
*G06F 3/12* (2006.01)
(52) U.S. Cl.
CPC .......... *G06F 3/1204* (2013.01); *G06F 3/1273* (2013.01); *G06F 3/1286* (2013.01)
(58) Field of Classification Search
CPC ..... G06F 3/1204; G06F 3/1273; G06F 3/1286
USPC ....................................................... 358/1.15
See application file for complete search history.

(56) References Cited

U.S. PATENT DOCUMENTS

| 8,693,018 B2* | 4/2014 | Ito .......................... G06F 3/1206 358/1.14 |
| 2009/0262393 A1* | 10/2009 | Yamada ................. G06F 3/1204 358/1.15 |
| 2010/0141990 A1* | 6/2010 | Yamada ............. H04N 1/32507 358/448 |
| 2012/0050805 A1* | 3/2012 | Fukasawa ............. H04L 67/563 358/1.15 |
| 2012/0099138 A1* | 4/2012 | Hirata ................ G03G 15/5087 358/1.14 |
| 2014/0367907 A1* | 12/2014 | Mori ................... G03G 15/6541 270/1.01 |
| 2016/0034235 A1* | 2/2016 | Ogisu .................... G06F 3/1263 358/1.15 |
| 2020/0042260 A1* | 2/2020 | Kanamoto ............ G06F 3/1253 |

FOREIGN PATENT DOCUMENTS

JP  2019-215752  12/2019

\* cited by examiner

*Primary Examiner* — Allen H Nguyen
(74) *Attorney, Agent, or Firm* — Lex IP Meister, PLLC (57) ABSTRACT

A print job transmitting device acquires the job execution order from the image forming apparatus every time a specific time period is lapse until the job execution order acquired from the image forming apparatus is not different from a new job execution order after requesting the image forming apparatus to change the job execution order into the new job execution order, and notifies the job execution order acquired from the image forming apparatus when the job execution order acquired from the image forming apparatus is not different from the new job execution order.

4 Claims, 8 Drawing Sheets

PRINT JOB TRANSMITTING DEVICE FOR TRANSMITTING A PRINT JOB AND NON-TRANSITORY COMPUTER-READABLE RECORDING MEDIUM STORING A PRINT JOB TRANSMITTING PROGRAM FOR THE SAME

INCORPORATION BY REFERENCE

This application is based upon, and claims the benefit of priority from, corresponding Japanese Patent Application No. 2020-132471 filed in the Japan Patent Office on Aug. 4, 2020, the entire contents of which are incorporated herein by reference.

BACKGROUND

Field of the Invention

The present disclosure relates to a print job transmitting device for transmitting a print job and a computer-readable non-transitory recording medium storing a print job transmitting program.

Description of Related Art

Typically, an image forming system, which includes an image forming apparatus to perform printing and a print job transmitting device to transmit a print job to the image forming apparatus, is known. The image forming apparatus can implement multi-managing of execution orders of a plurality of print jobs (hereinafter referred to as a "job execution order").

SUMMARY

A print job transmitting device of the present disclosure includes: a print job transmitting device to transmit a print job to an image forming apparatus; an order change requester to request the image forming apparatus to change a job execution order, as an execution order of print jobs, that is managed by the image forming apparatus; and an order notifier to acquire the job execution order managed by the image forming apparatus and notify the acquired job execution order. The order notifier acquires the job execution order from the image forming apparatus every time the specific time period is lapse until the job execution order acquired from the image forming apparatus is not different from a new job execution order after the order change requester requests the image forming apparatus to change the job execution order into the new job execution order, and the order notifier notifies the job execution order acquired from the image forming apparatus when the job execution order acquired from the image forming apparatus is not different from the new job execution order.

A non-transitory computer-readable recording medium of the present disclosure stores a print job transmitting program, the print job transmitting program causes a computer to realize: a print job transmitting device to transmit a print job to an image forming apparatus; an order change requester to request the image forming apparatus to change a job execution order, as an execution order of print jobs, that is managed by the image forming apparatus; and an order notifier to acquire the job execution order managed by the image forming apparatus and notify the acquired job execution order. The order notifier acquires the job execution order from the image forming apparatus every time the specific time period is lapse until the job execution order acquired from the image forming apparatus is not different from a new job execution order after the order change requester requests the image forming apparatus to change the job execution order into the new job execution order, and the order notifier notifies the job execution order acquired from the image forming apparatus when the job execution order acquired from the image forming apparatus is not different from the new job execution order.

DETAILED DESCRIPTION

Now, some embodiments of the present disclosure will be described below with reference to the drawings.

First, an image forming system according to an embodiment of the disclosure will be described.

Figure 1:
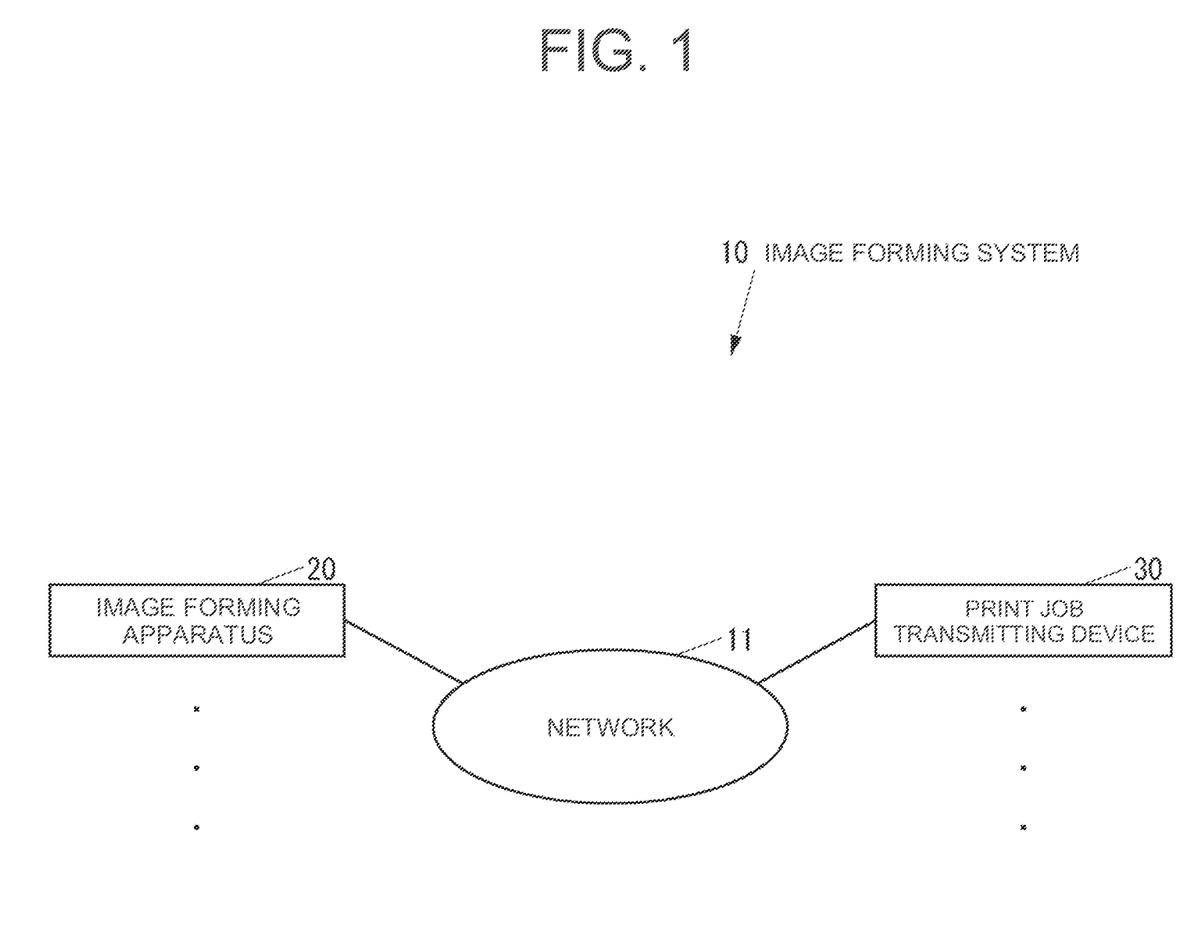
FIG. 1 is a block diagram illustrating an image forming system according to an embodiment of the present disclosure.

FIG. 1 is a block diagram illustrating an image forming system 10 according to the present embodiment.

As shown in FIG. 1, the image forming system 10 includes an image forming apparatus 20 to perform printing. The image forming system 10 can include at least one image forming apparatus, which has a configuration similar to a configuration of the image forming apparatus 20, other than the image forming apparatus 20. The image forming apparatus is, for example, configured of an MFP (Multifunction Peripheral), a production printer, and the like.

The image forming system 10 includes a print job transmitting device 30 as a computer to transmit print jobs to the image forming apparatus. The image forming system 10 can include at least one print job transmitting device, which has a configuration similar to a configuration of the print job transmitting device 30, other than the print job transmitting device 30. The print job transmitting device 30 is, for example, configured of a PC (Personal Computer).

The image forming apparatus in the image forming system 10 and the print job transmitting device in the image forming system 10 can communicate with each other via a network 11 such as a LAN (Local Area Network), an Internet, or the like, for example.

Figure 2:
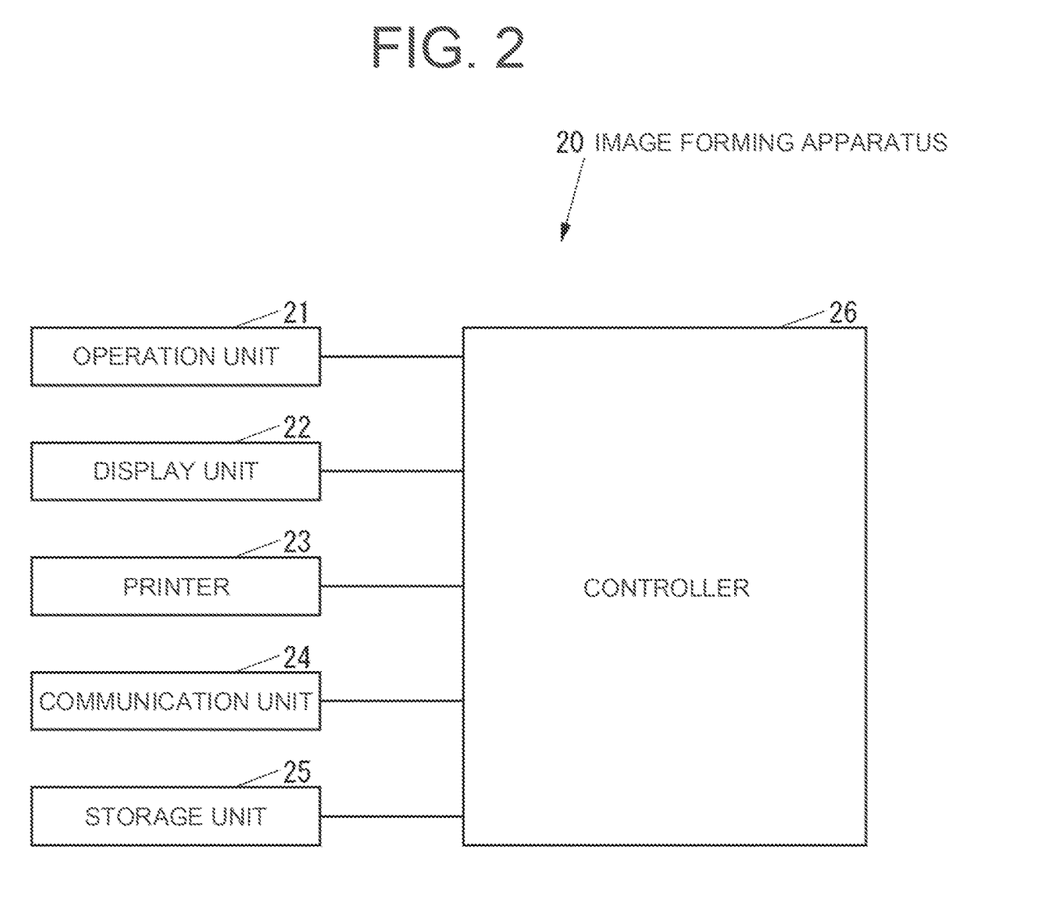
FIG. 2 is a block diagram illustrating an image forming apparatus illustrated in FIG. 1.

FIG. 2 is a block diagram illustrating the image forming apparatus 20.

As shown in FIG. 2, the image forming apparatus 20 includes: an operation unit 21 being an operation device such as a button for example to input various operations; a display unit 22 being an display device such as a LCD (Liquid Crystal Display) for example to display various pieces of information; a printer 23 being a printing device to print an image on a recording medium such as a paper; a communication unit 24 being a communication device to communicate via a network such as the LAN or the Internet, or directly through a wired or wireless communication without via the network with external devices; a storage unit 25 being a non-volatile storage device such as a semiconductor memory or a HDD (Hard Disk Drive) for example to store various pieces of information; and a controller 26 to control the entire image forming apparatus 20.

The controller 26 includes, for example, a CPU (Central Processing Unit), a ROM (Read Only Memory) to store programs and various data, and a RAM (Random Access Memory) to be used as a working memory area of the CPU of the controller 26. The CPU of the controller 26 executes the program stored in the storage unit 25 or the ROM of the controller 26.

The image forming apparatus 20 manages an execution order of the print jobs, that is, the job execution order. In an event that the print job transmitting device requests the image forming apparatus 20 to change the job execution order, although the image forming apparatus notifies the print job transmitting device of an acknowledgment of the request to change the job execution order, it does not notify the print job transmitting device that changing the job execution order is completed.

Figure 3:
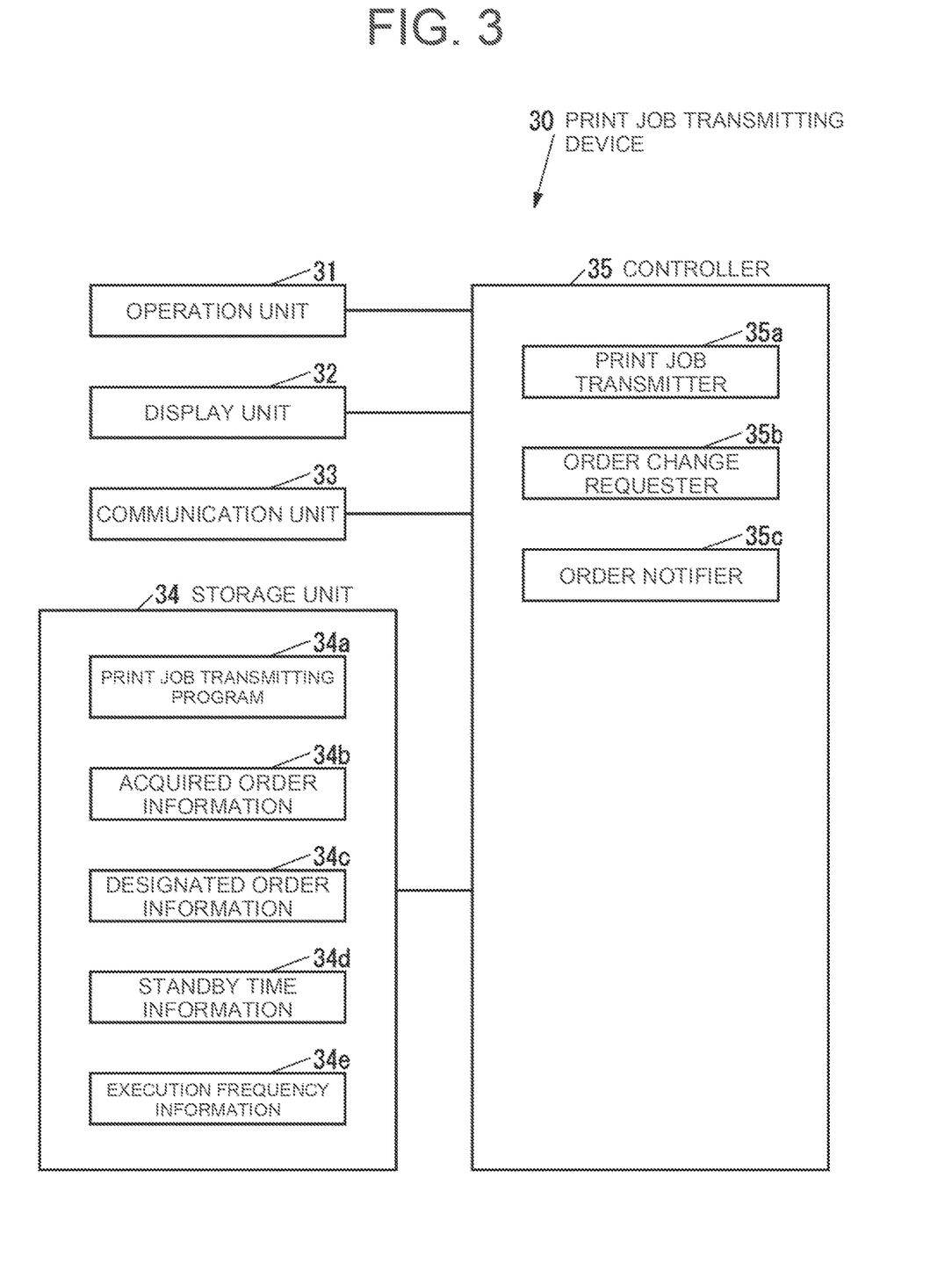
FIG. 3 is a block diagram illustrating a print job transmitting device illustrated in FIG. 1.

FIG. 3 is a block diagram illustrating the print job transmitting device 30.

As shown in FIG. 3, the print job transmitting device 30 includes: an operation unit 31 being an operation device such as a keyboard and a mouse for example to input various operations; a display unit 32 being an display device such as a LCD for example to display various pieces of information; a communication unit 33 being a communication device to communicate via a network such as the LAN or the Internet, or directly through a wired or wireless communication without via the network with external devices; a storage unit 34 being a non-volatile storage device such as the semiconductor memory or the HDD for example to store various pieces of information; and a controller 35 to control the entire print job transmitting device 30.

The storage unit 34 stores a print job transmitting program 34a for transmitting the print jobs. The print job transmitting program 34a may be preinstalled in the print job transmitting devices 30 when manufacturing the print job transmitting device 30 for example, or may be additionally installed in the print job transmitting device 30 from an external storage medium such as a CD (Compact Disk), a DVD (Digital Versatile Disk), or a USB (Universal Serial Bus) memory, or via the network.

The memory unit 34 can store acquired order information 34b indicating the job execution order acquired from the image forming apparatus 20.

The storage unit 34 can store designated order information 34c indicating the job execution order designated as a new job execution order.

The storage unit 34 stores standby time information 34d indicating a standby time for acquiring the job execution order from the image forming apparatus 20. A default value of the standby time indicated in the standby time information 34d is 4 seconds, for example.

The storage unit 34 stores execution frequency information 34e indicating an execution frequency of acquisition of the job execution order from the image forming apparatus 20.

The controller 35 includes, for example, a CPU, a ROM to store programs and various data, and a RAM to be used as a working memory area of the CPU of the controller 35. The CPU of the controller 35 executes the program stored in the storage unit 34 or the ROM of the controller 35.

By executing the print job transmitting program 34a, the controller 35 realizes a print job transmitting device 35a to transmit the print jobs to the image forming apparatus 20, an order change requester 35b to request the image forming apparatus 20 to change the print job execution order which is managed with the image forming apparatus 20, and an order notifier 35c to acquire the print job execution order which is managed with the image forming apparatus 20 and notify the acquired job execution order.

Next, operation of the image forming system 10 will be described.

First, operation of the print job transmitting device 30 will be described in association with a case where a job list screen showing a list of print jobs is displayed.

Figure 4:
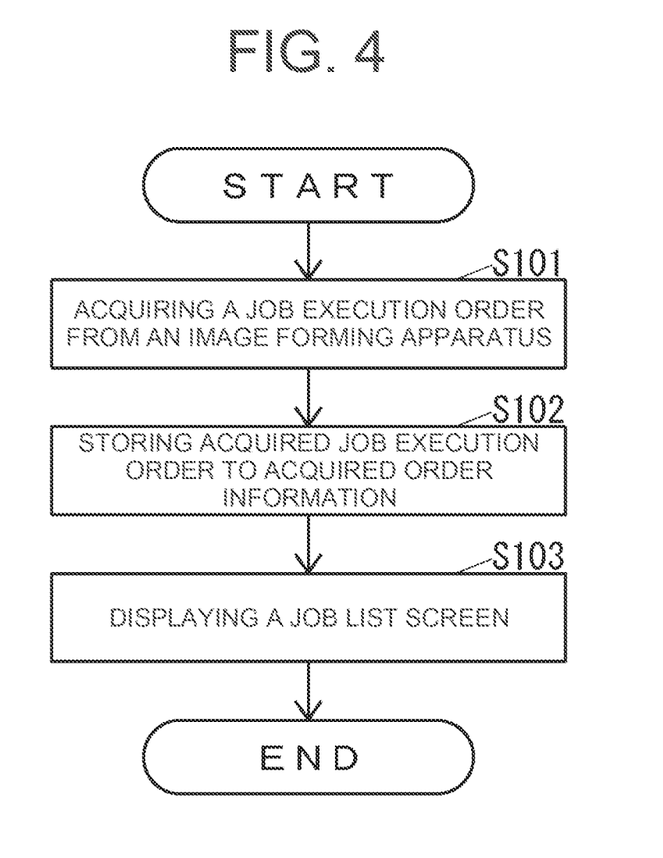
FIG. 4 is a flowchart illustrating operation of the print job transmitting device illustrated in FIG. 3 in a case of displaying a job list screen

FIG. 4 is a flowchart illustrating the operation of the print job transmitting device 30 in a case of displaying the job list screen.

With the print job transmitting program 34a being running, a user of the print job transmitting device 30 is able to instruct the print job transmitting device 30 to display the job list screen through the operation unit 31. When an instruction to display the job list screen is issued, the order notifier 35c of the print job transmitting device 30 executes the operation shown in FIG. 4.

As shown in FIG. 4, the order notifier 35c of the print job transmitting device 30 acquires the job execution order from the image forming apparatus 20 (S101).

After the process at the step S101, the order notifier 35c stores in the acquired order information 34b the job execution order which is acquired at the step S101 (S102).

After the process at the step S102, the order notifier 35c causes the display unit 32 to display the job list screen which shows the job execution order acquired at the step S101 and then the operation shown in FIG. 4 ends (S103).

Figure 5:
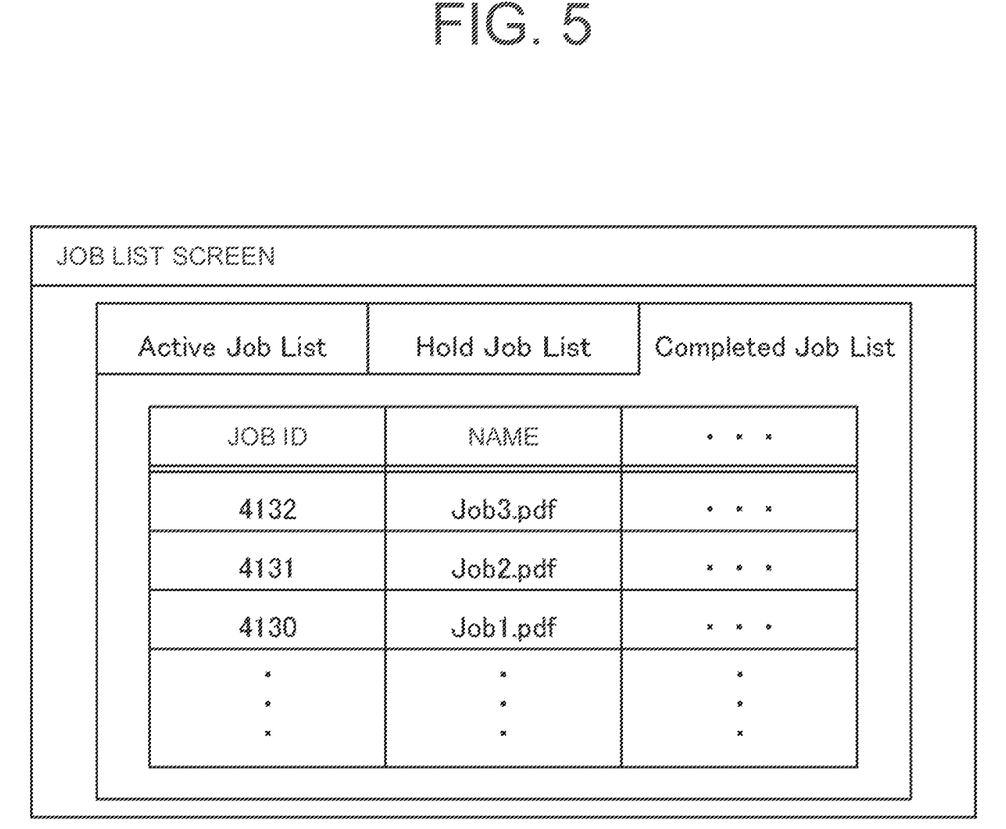
FIG. 5 is a diagram illustrating an example of the job list screen displayed by the operation illustrated in FIG. 4.

FIG. 5 is a diagram illustrating an example of the job list screen.

In the job list screen shown in FIG. 5, it is possible to selectably display in response to instructions input via the operation unit 31 either "Active Job List" which means a list of print jobs in which the printing processes are sequentially performed by the image forming apparatus 20, "Hold Job List" which means a list of print jobs to which the "Hold" setting is given, which is a setting to have the image forming apparatus 20 standby until an instruction to execute a printing process is issued, or "Completed Job List" which means a list of print jobs in which the printing processes have been completely executed by the image forming apparatus 20. In the example shown in FIG. 5, "Completed Job List" is displayed. Each of lists above mentioned includes, for example, a job ID as identification information and a name of the print job for every print job. Each of lists above-mentioned can include not only the print jobs transmitted by the print job transmitting device 35a of the print job transmitting device 30, but also print jobs transmitted by the print job transmitting device of a print job transmitting device other than the print job transmitting device 30. In each of lists above-mentioned, the upper the print job is displayed at, the earlier the execution order is.

Next, when changing the job execution order in the image forming apparatus 20, the operation of the image forming system 10 will be described.

Figure 6:
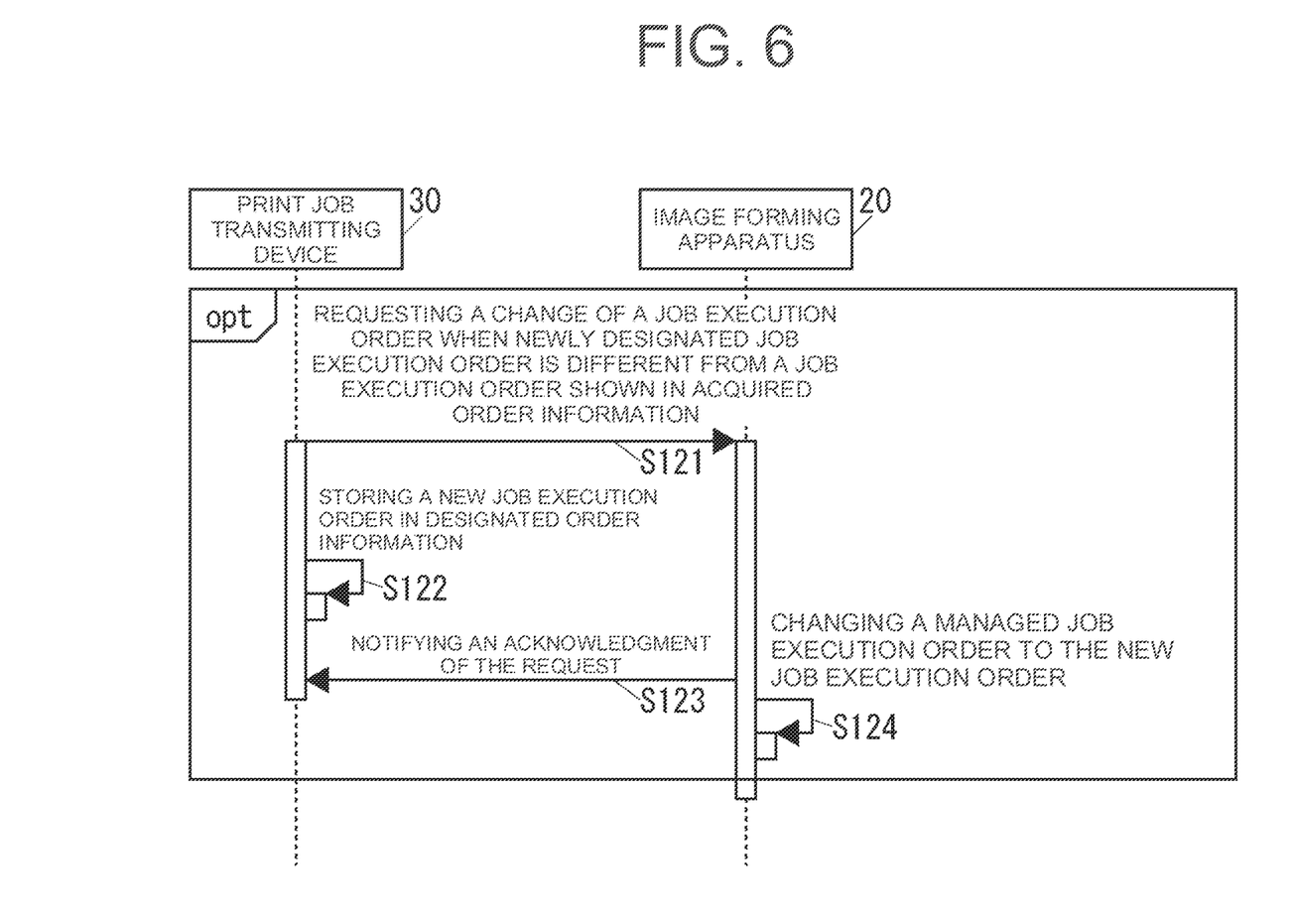
FIG. 6 is a sequence diagram illustrating the operation of the image forming system illustrated in FIG. 1 in a case of changing a job execution order in the image forming apparatus.

FIG. 6 is a sequence diagram illustrating the operation of the image forming system 10 when changing the job execution order in the image forming apparatus 20.

The user of the print job transmitting device 30 is able to instruct the print job transmitting device 30 through the operation unit 31 to change the job execution order by designating a new job execution order for the job execution order shown on the job list screen displayed on the display unit 32. Here, the user of the print job transmitting device 30 is able to specify any one of the "Active Job List", the "Hold Job List", and the "Completed Job List", and instruct the print job transmitting device 30 to change the job execution order of the specified list. Upon the instruction to change the job execution order is issued, the order change requester 35*b* of the print job transmitting device 30 performs operation shown in FIG. 6.

As shown in FIG. 6, when a new job execution order designated by the user is different from the job execution order indicated in the acquired order information 34*b*, the order change requester 35*b* of the print job transmitting device 30 requests the image forming apparatus 20 to change the job execution order (S121). The new job execution order designated by the user is included in the request at the step S121 by the order change requester 35*b*.

After the process at the step S121, the order change requester 35*b* stores the new job execution order designated by the user in the designated order information 34*c* (S122).

Upon the controller 26 of the image forming apparatus 20 receives the request at the step S121, it notifies the print job transmitting device 30 of an acknowledgment of the request to change the job execution order (S123).

After the process at the step S123, the controller 26 changes the job execution order managed by the image forming apparatus 20 to the new job execution order included in the request at the step S121 (S124). After receiving the request at the step S121, the controller 26 performs the process at the step S124 at arbitrary timing in the image forming apparatus 20.

Next, in a case of requesting a change of the job execution order to the image forming apparatus 20, operation of the print job transmitting device 30 will be described.

Figure 7:
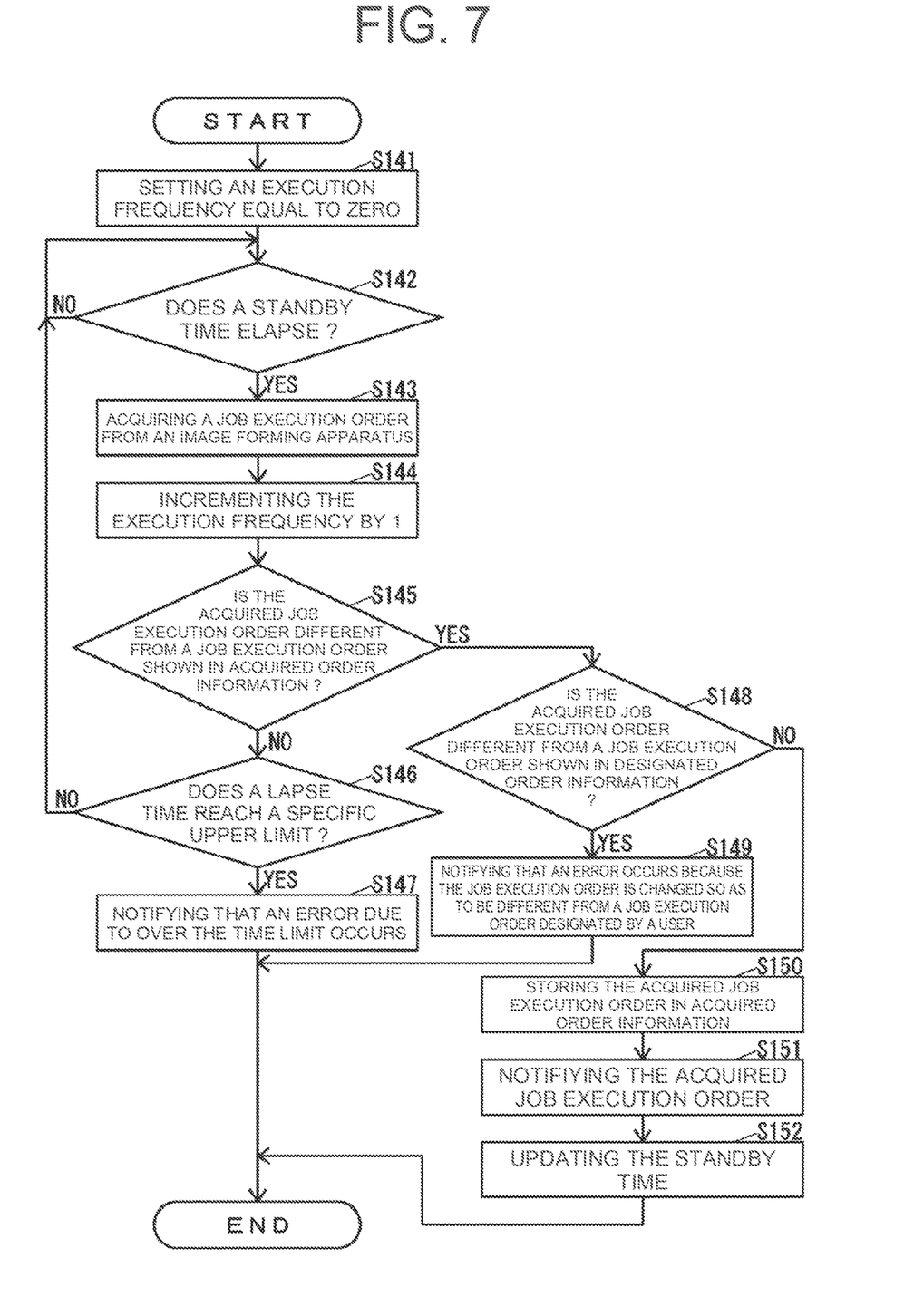
FIG. 7 is a flowchart illustrating the operation of the print job transmitting device illustrated in FIG. 3 in a case of requesting the image forming apparatus to change the job execution order.

FIG. 7 is a flowchart illustrating the operation of the print job transmitting device 30 in a case of requesting the image forming apparatus 20 to change the job execution order.

Upon the request to change the job execution order is issued to the image forming apparatus 20 at the step S121, the order notifier 35*c* of the print job transmitting device 30 performs the operation shown in FIG. 7.

As shown in FIG. 7, the order notifier 35*c* sets to zero an execution frequency indicated in the execution frequency information 34*e* (S141).

After the process at the step S141, the order notifier 35*c* determines whether a standby time indicated in the standby time information 34*d* elapses until it determines that the standby time indicated in the standby time information 34*d* has elapsed (S142). The standby time at the step S142 intends to improve a possibility that the print job transmitting device 30 can acquire the job execution order from the image forming apparatus 20 after changing of the job execution order is completed in the image forming apparatus 20.

When the order notifier 35*c* determines that the standby time indicated in the standby time information 34*d* has elapsed at the step S142, it acquires the job execution order from the image forming apparatus 20 (S143).

After the process at the step S143, the order notifier 35*c* increments by one the execution frequency indicated in the execution frequency information 34*e* (S144).

After the process at the step S144, the order notifier 35*c* determines whether the job execution order acquired at the step S143 is different from the job execution order indicated in the acquired order information 34*b* (S145). For example, in a case where the job execution order indicated in the acquired order information 34*b* comes job A, job B, and job C in this order, if the job execution order acquired at the step S143 comes job A, job B, and job C in this order, the order notifier 35*c* determines that the job execution order acquired at the step S143 is not different from the job execution order indicated in the acquired order information 34*b* at the step S145. On the other hand, in a case where the job execution order indicated in the acquired order information 34*b* comes job A, job B, and job C in this order, if the job execution order acquired at the step S143 comes job B, job C, and job A in this order or job B, job A, and job C in this order for example, the order notifier 35*c* determines that the job execution order acquired at the step S143 is different from the job execution order indicated in the acquired order information 34*b* at the step S145.

Upon the order notifier 35*c* determines that the job execution order acquired at the step S143 is not different from the job execution order indicated in the acquired order information 34*b* at the step S145, the order notifier 35*c* determines whether a lapse time since the start of the operation shown in FIG. 7 reaches a specific upper limit time (S146). The specific time period is five seconds, for example.

When the order notifier 35*c* determines that the lapse time since the start of the operation shown in FIG. 7 does not reach the specific upper limit time at the step S146, the order notifier 35*c* performs the process at the step S142 again.

Upon the order notifier 35*c* determines at the step S146 that the lapse time since the start of the operation shown in FIG. 7 has reached the specific upper limit time, the order notifier 35*c* notifies that an error due to over the time limit occurs (S147) by causing the display unit 32 to display it and then the operation shown in FIG. 7 ends. The error due to over the time limit can occur due to an internal factor of the image forming apparatus 20 and the like, for example.

Upon the order notifier 35*c* determines that the job execution order acquired at the step S143 is different from the job execution order indicated in the acquired order information 34*b* at the step S145, the order notifier 35*c* determines whether the job execution order acquired at the step S143 is different from the job execution order indicated in the designated order information 34*c* (S148). For example, in a case where the job execution order indicated in the designated order information 34*c* comes job B, job C, and job A in this order, if the job execution order acquired at the step S143 comes job B, job C, and job A in this order, the order notifier 35*c* determines that the job execution order acquired at the step S143 is not different from the job execution order indicated in the designated order information 34*c* at the step S148. On the other hand, in a case where the job execution order indicated in the designated order information 34*c* comes job B, job C, and job A in this order, if the job execution order acquired at the step S143 comes job B, job A, and job C in this order for example, the order notifier 35*c* determines that the job execution order acquired at the step S143 is different from the job execution order indicated in the designated order information 34c at the step S148.

Upon the order notifier 35c determines that the job execution order acquired at the step S143 is different from the job execution order indicated in the designated order information 34c at the step S148, the order notifier 35c notifies that an error occurs because the job execution order in the image forming apparatus 20 is changed so as to be different from the job execution order designated by the user (S149) by causing the display unit 32 to display that the error occurs and then the operation shown in FIG. 7 ends. An error because the job execution order in the image forming apparatus 20 is changed so as to be different from the job execution order designated by the user can occur due to an internal factor of the image forming apparatus 20 and the like, for example.

Upon the order notifier 35c determines that the job execution order acquired at the step S143 is different from the job execution order indicated in the designated order information 34c at the step S148, the order notifier 35c stores the job execution order acquired in S143 in the acquired order information 34b (S150).

After the process at the step S150, the order notifier 35c notifies the job execution order acquired at the step S143 by causing the display unit 32 to display it (S151). For example, the order notifier 35c notifies the job execution order acquired at the step S143 by causing the display unit 32 to display the job list screen showing the job execution order acquired at the step S143.

After the process at the step S151, the order notifier 35c updates the standby time indicated in the standby time information 34d based on the standby time indicated in the standby time information 34d and the execution frequency indicated in the execution frequency information 34e (S152). For example, the order notifier 35c defines the updated standby time as "T×(N−1)+T/2", wherein T is the standby time indicated in the standby time information 34d, and N is the execution frequency indicated in the execution frequency information 34e.

After the process at the step S152, the order notifier 35c ends the operation shown in FIG. 7.

Figure 8:
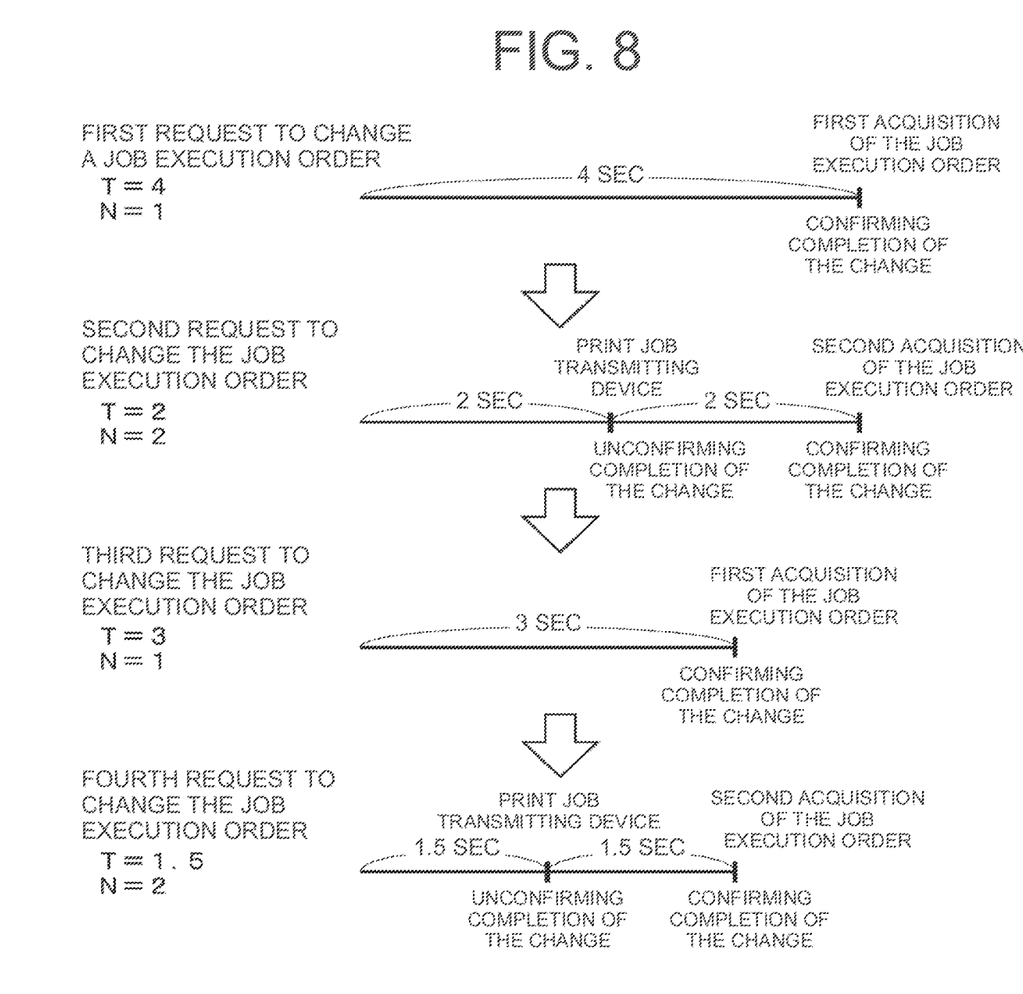
FIG. 8 is a diagram illustrating an example of updating a standby time indicated in standby time information illustrated in FIG. 3.

FIG. 8 is a diagram illustrating an example of updating the standby time shown in the standby time information 34d.

In the example shown in FIG. 8, in the first requesting the image forming apparatus 20 to change the job execution order, the standby time T indicated in the standby time information 34d is 4 seconds. Furthermore, by acquiring the first job execution order it is confirmed that the change of the job execution order in the image forming apparatus 20 is completed, and the execution frequency N indicated in the execution frequency information 34e is one. Therefore, the standby time indicated in the standby time information 34d in the second requesting the image forming apparatus 20 to change the job execution order comes to "4×(1−1)+4/2", that is, 2 seconds.

Furthermore, in the second requesting the image forming apparatus 20 to change the job execution order, the standby time T indicated in the standby time information 34d comes to 2 seconds. Furthermore, by acquiring the second job execution order it is confirmed that the change of the job execution order in the image forming apparatus 20 is completed, and the execution frequency N indicated in the execution frequency information 34e comes to two. Therefore, the standby time indicated in the standby time information 34d in the third requesting the image forming apparatus 20 to change the job execution order comes to "2×(2−1)+2/2", that is, 3 seconds.

Furthermore, in the third requesting the image forming apparatus 20 to change the job execution order, the standby time T indicated in the standby time information 34d comes to 3 seconds. Furthermore, by acquiring the first job execution order it is confirmed that the change of the job execution order in the image forming apparatus 20 is completed, and the execution frequency N indicated in the execution frequency information 34e is one. Therefore, the standby time indicated in the standby time information 34d in the fourth requesting the image forming apparatus 20 to change the job execution order comes to "3×(1−1)+3/2", that is, 1.5 seconds.

Furthermore, in the fourth requesting the image forming apparatus 20 to change the job execution order, the standby time T indicated in the standby time information 34d comes to 1.5 seconds. Furthermore, by acquiring the second job execution order it is confirmed that the change of the job execution order in the image forming apparatus 20 is completed, and the execution frequency N indicated in the execution frequency information 34e comes to two. Therefore, the standby time indicated in the standby time information 34d in the fifth requesting the image forming apparatus 20 to change the job execution order comes to "1.5×(2−1)+1.5/2", that is, 2.25 seconds.

As described above, it is possible to reduce a chance of failure of notifying a changed job execution order because the print job transmitting device 30 acquires the job execution order from the image forming apparatus 20 every time the specific time period is lapse (YES at the step S142 and NO at the step S143) until the job execution order acquired from the image forming apparatus 20 is not different from the new job execution order (YES at the step S145 and NO at the step S148) after requesting the image forming apparatus 20 to change the job execution order into the new job execution order at the step S121, and notifies the job execution order acquired from the image forming apparatus 20 (S151) when the job execution order acquired from the image forming apparatus 20 is not different from the new job execution order (YES at the step S145 and NO at the step S148).

It is possible to reduce a time interval between the completion of the change of the job execution order in the image forming apparatus 20 at the step S124 and the notification of the job execution order acquired from the image forming apparatus 20 at the step S151, and as a result, it is possible to achieve a real-time notification of the job execution order which would be changed because the print job transmitting device 30 defines a time period for acquiring the job execution order from the image forming apparatus 20 based on the time required until the job execution order acquired from the image forming apparatus 20 is not different from the new job execution order at the step S152.

Meanwhile, if the standby time indicated in the standby time information 34d is reduced less than necessary, the number of times the print job transmitting device 30 acquires the job execution order from the image forming apparatus 20 increases more than necessary, and as a result, the load applied to the network 11, the image forming apparatus 20, and the print job transmitting device 30 increases more than necessary. However, it is possible to prevent the standby time indicated in the standby time information 34d from being reduced less than necessary, and as a result, it is possible to suppress the more than necessary increasing of the load applied to the network 11, the image forming apparatus 20, and the print job transmitting device 30 because the print job transmitting device 30 defines the time period for acquiring the job execution order from the image forming apparatus 20 based on the time required until the job execution order acquired from the image forming apparatus 20 is not different from the new job execution order at the step S152. Therefore, the print job transmitting device 30 can suppress a decrease in the printing speed in the image forming apparatus 20, for example.

As a method of defining the time period for acquiring the job execution order from the image forming apparatus 20 based on the time required until the job execution order acquired from the image forming apparatus 20 is not different from the new job execution order, the print job transmitting device 30 in the present embodiment employs a way using the formula "T×(N−1)+T/2". However, as a method of defining the time period for acquiring the job execution order from the image forming apparatus 20 based on the time required until the job execution order acquired from the image forming apparatus 20 is not different from the new job execution order, the print job transmitting device 30 may employ another way other than the way using the formula "T×(N−1)+T/2".

What is claimed is:

1. A print job transmitting device comprising:
    a print job transmitter to transmit a print job to an image forming apparatus;
    an order change requester to request the image forming apparatus to change a job execution order, as an execution order of print jobs, that is managed by the image forming apparatus; and
    an order notifier to acquire the job execution order managed by the image forming apparatus and notify the acquired job execution order,
    wherein during a predetermined time period after the order change requester requests the image forming apparatus to change the job execution order into a new job execution order, the order notifier repeatedly acquires the job execution order managed by the image forming apparatus until the order notifier determine that the job execution order managed by the image forming apparatus indicates the new job execution order, and
    the order notifier notifies the job execution order acquired from the image forming apparatus when the order notifier determine that the job execution order managed by the image forming apparatus indicates the new job execution order during the predetermined time period.

2. The print job transmitting device according to claim 1, wherein the order notifier defines the specific time period based on a time required until the job execution order managed by the image forming apparatus indicates the new job execution order.

3. The print job transmitting device according to claim 1, wherein in a case where the order notifier does not determine that the job execution order managed by the image forming apparatus indicates the new job execution order during the predetermined time period, the order notifier stops acquiring the job execution order managed by the image forming apparatus.

4. A non-transitory computer-readable recording medium storing a print job transmitting program to cause a computer to realize:
    a print job transmitter to transmit a print job to an image forming apparatus;
    an order change requester to request the image forming apparatus to change a job execution order, as an execution order of print jobs, that is managed by the image forming apparatus; and
    an order notifier to acquire the job execution order managed by the image forming apparatus and notify the acquired job execution order,
    wherein during a predetermined time period after the order change requester requests the image forming apparatus to change the job execution order into a new job execution order, the order notifier repeatedly acquires the job execution order managed by the image forming apparatus until the order notifier determine that the job execution order managed by the image forming apparatus indicates the new job execution order, and
    the order notifier notifies the job execution order acquired from the image forming apparatus when the order notifier determine that the job execution order managed by the image forming apparatus indicates the new job execution order during the predetermined time period.

* * * * *